A. J. OLSEN.
WALKING TRACTOR.
APPLICATION FILED APR. 15, 1918.
1,287,086.
Patented Dec. 10, 1918.
2 SHEETS—SHEET 1.
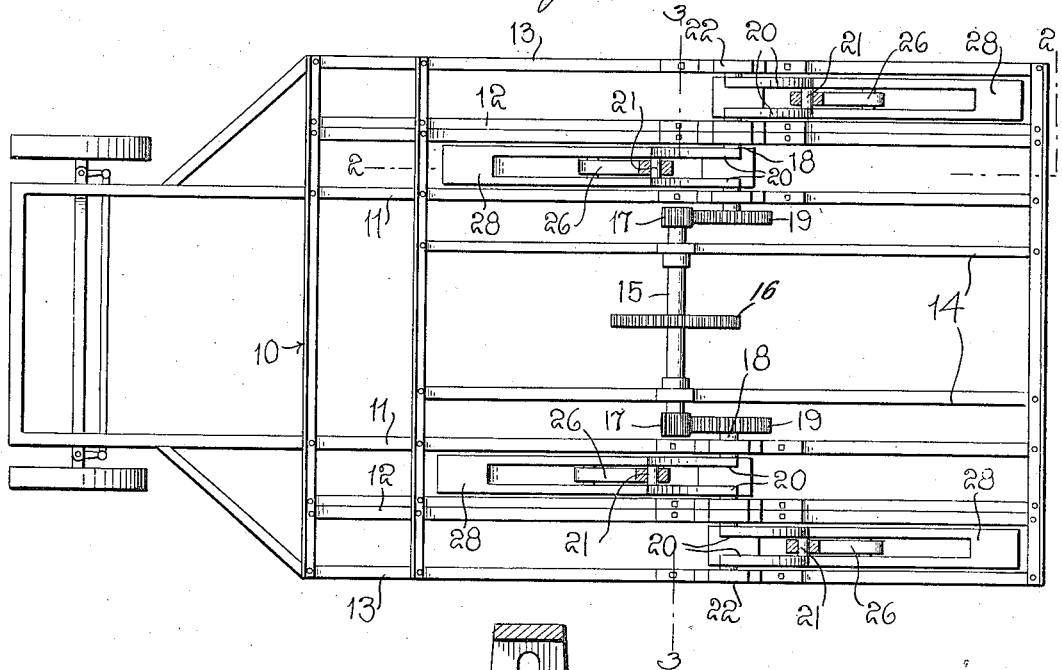
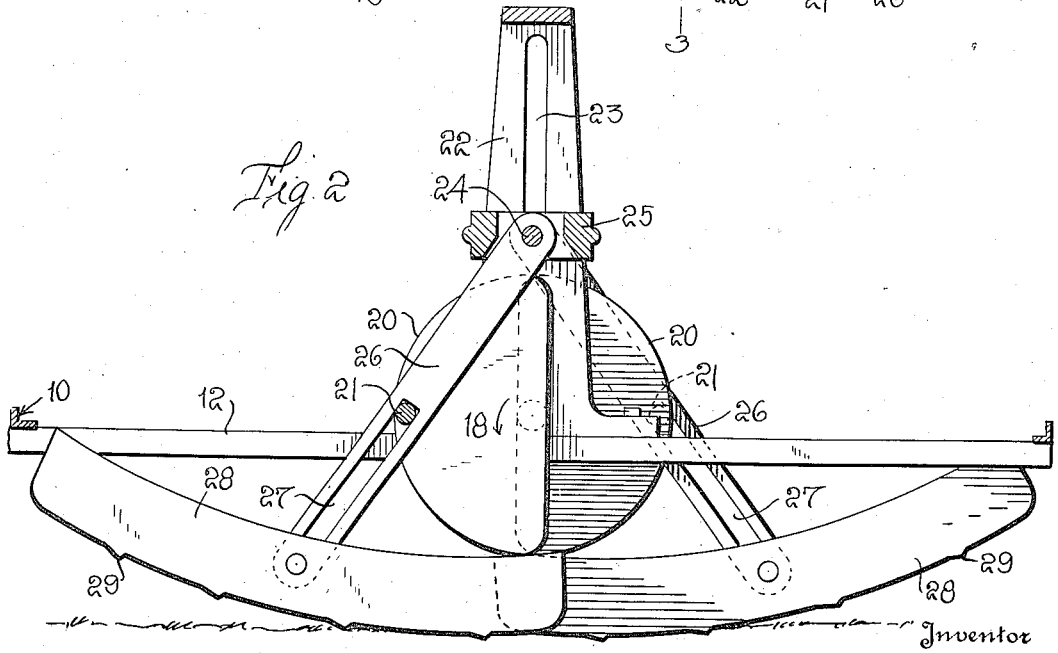
Inventor
A. J. Olsen
By Watson E. Coleman
Attorney A. J. OLSEN.
WALKING TRACTOR.
APPLICATION FILED APR. 15, 1918.
1,287,086. Patented Dec. 10, 1918.
2 SHEETS—SHEET 2.
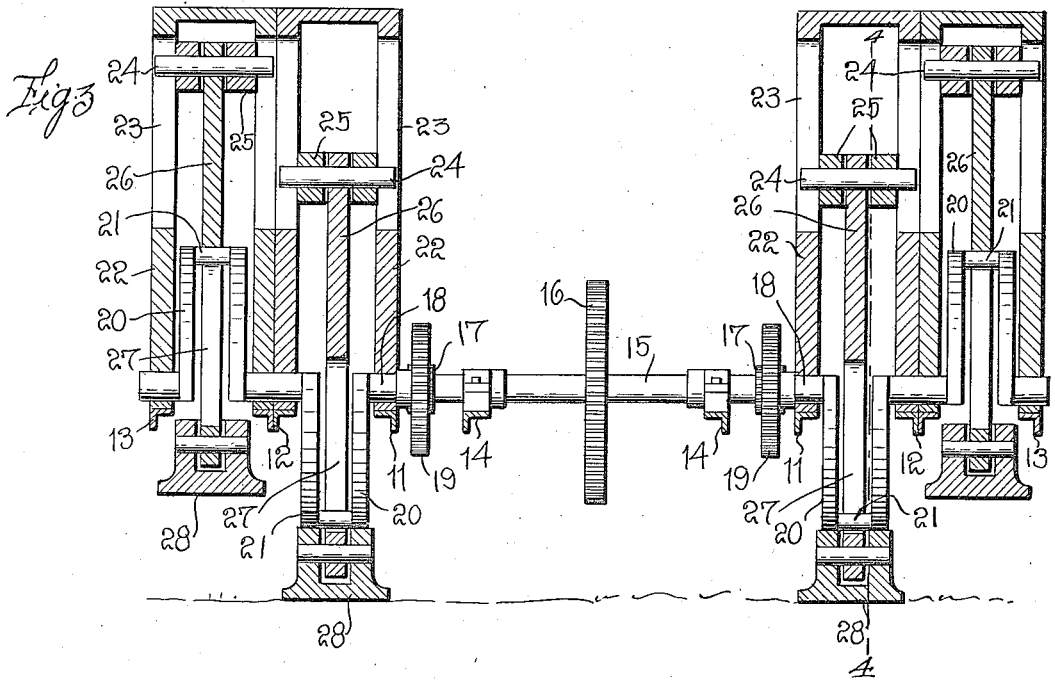
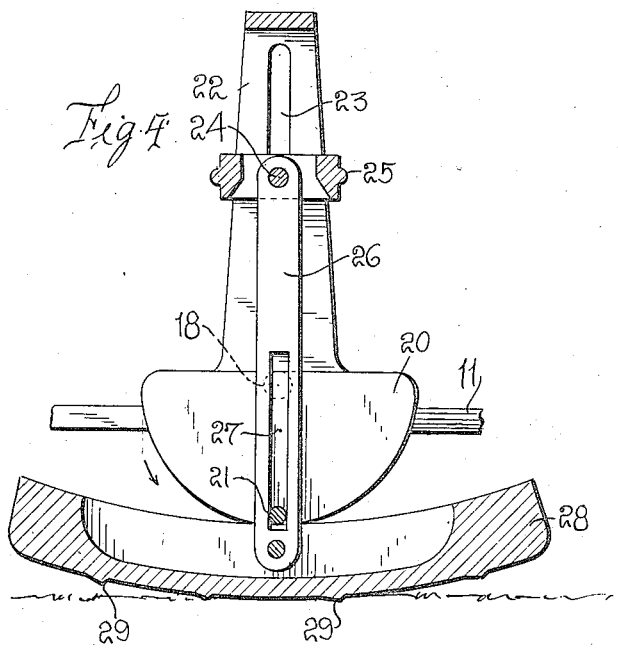
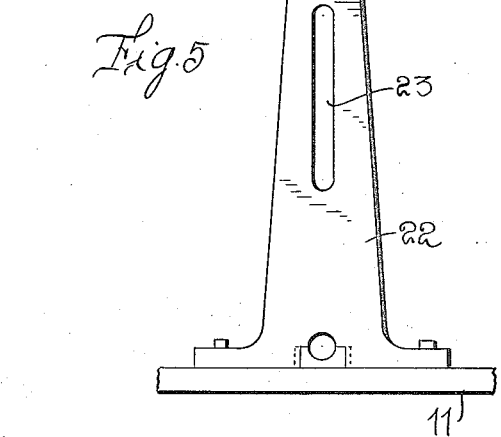
Inventor
A. J. Olsen
By Watson E. Coleman
Attorney

UNITED STATES PATENT OFFICE.

ANDERS J. OLSEN, OF THORHULT, MINNESOTA.

WALKING-TRACTOR.

1,287,086.            Specification of Letters Patent.        Patented Dec. 10, 1918.

Application filed April 15, 1918. Serial No. 228,650.

*To all whom it may concern:*

Be it known that I, ANDERS J. OLSEN, a citizen of the United States, residing at Thorhult, in the county of Beltrami and State of Minnesota, have invented certain new and useful Improvements in Walking-Tractors, of which the following is a specification, reference being had to the accompanying drawings.
This invention relates to traction engines, and particularly to traction engines in which the traction elements consist of ground engaging members which are oscillated or have a walking action as distinguished from endless ground engaging elements which move continuously through a circular or elliptical path.

The general object of this invention is to provide an improved means for operating ground engaging elements of a tractor of this description, and to provide an improved shoe for engaging the ground.

A further object is to provide a construction in which the ground engaging shoes or members will be held for a relatively long period upon the ground before they are lifted, to thereby secure a maximum tractive effect.

A further object is to provide means whereby the ground engaging elements will be forced into firm engagement with the ground.

Other objects will appear in the course of the following description.
My invention is illustrated in the accompanying drawings, wherein:—

Figure 1 is a top plan view of a tractor constructed in accordance with my invention, the pitmen being in section;
Fig. 2 is a vertical sectional view taken on the line 2—2 of Fig. 1;

Fig. 3 is a transverse vertical sectional view on the line 3—3 of Fig. 1, showing the crank in vertical position;
Fig. 4 is a sectional view on the line 4—4 of Fig. 3; and Fig. 5 is a vertical sectional view of one of the standards.

Referring to the drawings, 10 designates generally the frame of a traction engine, which frame, as is obvious, may be made in any suitable form, but I have illustrated this frame as having longitudinally extending supporting beams or framing members 11, 12 and 13, which may be of angle iron, channel iron or of any other suitable form.

Supported in suitable bearings carried by longitudinally-extending beams 14 is a shaft 15 carrying a gear wheel 16, this shaft 15 being operatively connected to any suitable motor (not shown). The shaft 15 carries upon it pinions 17.

Disposed in suitable bearings in the members 11, 12 and 13 on each side of the frame are the crank shafts 18. The inner ends of these crank shafts carry gear wheels 19, which mesh with the pinions 17 so that the crank shafts are rotated thereby. The cranked portions of these shafts are of a peculiar form in that they consist of sector shaped members 20, as illustrated in Fig. 3, with a wrist pin 21 joining the sector shaped members at the middle of the curved face of each member. I have heretofore described the crank shaft 18 as if it was formed in one piece with the sector shaped members 20 and with the wrist pin 21, but it is obvious that the members 20 may be cast or formed separately from the shaft 18 proper and that in effect if this latter is the case, the crank shaft is formed of sections.

Mounted upon the beams 11 and 12 and extending upward therefrom are the standards 22, one of which is illustrated in Fig. 5, these standards being longitudinally slotted as at 23 and the crank shaft passing through the bases of these standards, there being a cranked portion (comprising the members 20 and 21) between each two of the standards 22. Operating in the slot 23 is a wrist pin 24 carried by suitable cross heads 25 which directly engage the walls of the slot and pivotally engaged with each wrist pin is the pitman 26 which is longitudinally slotted at its lower end as at 27. The wrist pin 21 of the corresponding pair of sector shaped members 20 passes through this slot 27.

Pivoted to the lower end of each of the pitmen 26 is the shoe 28 which is formed of an integral casting, this shoe being longitudinally curved or downwardly bowed and the under face of the shoe being formed with teeth 29, the teeth being inclined upward and formed so that the shoe may readily move forward with relation to the ground, but will engage the ground and exert tractive force thereagainst upon a movement of the shoe rearward. Each shoe has side walls, as illustrated in Fig. 3, which embrace the lower end of the corresponding pitman 26.

The operation of this invention will be obvious from what has gone before. As the cranks formed by the members 20 and 21 revolve the several pitmen will be advanced, then downwardly and forwardly inclined, then shifted downward so as to bring the corresponding shoes in contact with the ground, and then upon a continuation of the movement of the crank shaft, the shoes which engage the ground will be held stationary and the tractor moved forward upon the pitmen or legs as they may be termed, while at the same time those pitmen 26 and corresponding shoes which are elevated, are raised, moved forward, and then moved downward so as to take fresh hold on the ground. It will thus be seen that the walking movement is given to the several shoes and that the tractor is carried forward by this walking movement.

By reference to Figs. 2 and 4 it will be noted that the shoes 28 are not unyieldingly connected to the operating mechanism and that they are forced down into engagement with the ground by rolling contact with the sector shaped cranks 20, the edges of these cranks having rolling engagement with the upper faces of the shoes. If these cranks 18 were constructed in the ordinary manner a shoe would only bear upon the ground with its own weight, but by providing the sector-shaped cranks 18 pressure is applied only at that portion of the shoe which is immediately in contact with the ground so that first the rear end of the shoe is engaged by the sector-shaped crank, and then as the machine advances the middle of the shoe is so engaged as illustrated in Fig. 4, and then the forward end of the shoe is engaged thus permitting the shoe to rock as the tractor frame moves forward.

It will be seen that a maximum tractive power is secured and that the weighted cranks formed by the members 20 act to balance the crank shaft and also act to force the shoes firmly down upon the ground. It will be obvious that this mechanism may be varied in many ways without departing from the spirit of my invention, as the invention may be embodied in many different forms.

Having described my invention, what I claim is:

1. A tractor including a frame, a crank shaft having a cranked portion including a sector-shaped member and a wrist pin, a pitman longitudinally slotted at its lower end through which the wrist pin passes, means for swingingly and slidably supporting the pitman on the frame, and a ground engaging shoe pivoted to the lower end of the pitman for rocking movement and engaged by said sector-shaped member.

2. A tractor including a frame, a crank shaft having a cranked portion comprising two sector shaped members connected by a wrist pin, a pitman longitudinally slotted at its lower end and through which the wrist pin of the crank passes, means swingingly and slidingly supporting the upper end of the pitman, and a ground engaging shoe pivoted to the lower end of the pitman.

3. A tractor including a supporting frame, a pair of cranked shafts mounted upon the frame, each crank shaft having oppositely extending cranked portions, each crank shaft at its inner end carrying a gear wheel, a power driven wheel, a shaft with which the wheel operatively engages and having pinions engaging the gears on the crank shafts, a pair of vertically slotted standards mounted upon said frame and through the lower ends of which each crank shaft passes, a wrist pin operating in each slot at each standard, pitmen pivotally connected at their upper ends, each to one of the wrist pins, the lower end of each pitman being slotted and the wrist pin of the corresponding crank passing through said slot, and ground engaging shoes pivotally connected at the lower end of each pitman.

4. A tractor including a supporting frame, a cranked shaft mounted upon the frame, a pitman pivotally and slidingly and swingingly supported at its upper end, a shoe to which the lower end of the pitman is connected, and means for operatively connecting the crank shaft to the pitman and having rolling contact with the shoe to hold it in engagement with the ground.

5. A tractor including a frame, a crank shaft mounted thereon, a pitman slotted at its lower end through which the crank passes, the upper end of the pitman being slidingly and swingingly supported, a ground engaging shoe connected to the lower end of the pitman, and members mounted upon the crank shaft and having rolling contact with the upper face of the shoe when the latter is in its lowered, ground-engaging position.

6. A tractor including a frame, a crank shaft having a cranked portion extending transversely of the frame, said cranked portion including opposed sector-shaped members, and a wrist pin, a pair of vertically slotted standards, a wrist pin operating in the slots of the standards, a pitman slotted in its lower end through which the wrist pin on the sector-shaped members passes, and a ground-engaging shoe pivoted to the lower end of the pitman and with which the arcuate edge faces of the sector-shaped members engage when the shoe is in its lowered position.

7. A tractor including a frame, a crank shaft mounted thereon and having a cranked portion including oppositely disposed sector-shaped members and a connecting wrist pin, a pair of vertically slotted standards, a wrist pin operating in the slots of the standards, a pitman mounted at its upper end on said wrist pin, the lower end of the pitman being longitudinally slotted, the wrist pin on the sector-shaped members passing through said slot, and a ground-engaging shoe pivoted to the lower end of the pitman, said shoe being downwardly bowed and the arcuate faces of the sector-shaped members engaging the shoe and having rolling contact therewith when the shoe is in its depressed position.

In testimony whereof I hereunto affix my signature in the presence of two witnesses.

ANDERS J. OLSEN.

Witnesses:
 ALBERT PRESTELAK,
 FERDINAND TRESSELT.